United States Patent [19]
Sahashi

[11] Patent Number: 5,970,839
[45] Date of Patent: Oct. 26, 1999

[54] WORK CUTTING APPARATUS

[75] Inventor: Nobuo Sahashi, Inuyama, Japan

[73] Assignee: Murata Kikai Kabushiki Kaisha, Kyoto, Japan

[21] Appl. No.: 08/940,948

[22] Filed: Sep. 30, 1997

[30] Foreign Application Priority Data

Oct. 2, 1996 [JP] Japan ................................. 8-281888

[51] Int. Cl.$^6$ .................................................. B26D 5/16
[52] U.S. Cl. ............................... 83/628; 83/530; 83/686; 83/699.11; 83/699.51
[58] Field of Search ................................. 83/628, 639.1, 83/686, 699.11, 699.31, 699.41, 699.51, 699.61, 640, 694, 527, 529, 530

[56] References Cited

U.S. PATENT DOCUMENTS

| | | | |
|---|---|---|---|
| 1,885,438 | 11/1932 | Hazelton . | |
| 2,443,685 | 7/1948 | Lyche . | |
| 3,828,639 | 8/1974 | Roch | 83/390 |
| 4,463,642 | 8/1984 | Minato et al. | 83/530 |
| 4,507,997 | 4/1985 | Ikeda | 83/368 |
| 4,674,378 | 6/1987 | Kawano et al. | 83/368 |
| 5,042,345 | 8/1991 | Hawkins et al. | 83/385 |
| 5,189,934 | 3/1993 | Davidson et al. | 83/153 |
| 5,613,795 | 3/1997 | Antony et al. | 403/370 |

FOREIGN PATENT DOCUMENTS 1-15460  5/1989  Japan .

*Primary Examiner*—Lee Young
*Assistant Examiner*—Kevin G. Vereene
*Attorney, Agent, or Firm*—Armstrong, Westerman, Hattori, McLeland and Naughton

[57] ABSTRACT

A device that is able to reduce the variation in the clearance between the upper and lower blades and of which the clearance adjustment operation is simple. The work cutting apparatus has a freely rotating ram mounted with an upper blade. An axial direction pressure application means that prevents any play in the axial direction at the bearing being the rotating pivot of this ram by the application of pressure is arranged. The axial direction pressure application means applies pressure in the axial direction to the inner wheel of the bearing via the spacer by a cylinder attached to the rotating support shaft and pressurizes the bearing. The pair of upper and lower blades each form an approximate L-shape and the rotating support shaft is positioned such that it is at an angle within the horizontal plane with respect to each side of the upper and lower blades.

5 Claims, 10 Drawing Sheets

WORK CUTTING APPARATUS

FIELD OF THE INVENTION

The present invention relates to a workpiece cutting apparatus, such as right angle shear or similar, that cuts a workpiece, such as a metal place or similar, by a pair of upper and lower blades.

BACKGROUND OF THE INVENTION

A device whereby the upper blade is vertically moved by a guide is known as one type of conventional workpiece cutting apparatus. However, with the above-described kind of apparatus whereby the upper blade is moved vertically, the system for vertically moving and guiding the vertical movement of the upper blade becomes complicated and increases the costs.

In order to solve these kinds of problems, an apparatus has been proposed wherein a ram, having an upper blade mounted thereon, is pivoted vertically about a horizontal pivoting support shaft. Accordingly, the vertical movement system of the upper blade is simplified and the cost is decreased.

However, with an apparatus that vertically moves a ram, it is difficult to prevent variation in the clearance between the upper and lower blades.

Hereafter, an explanation of this will be given.

It is necessary to adjust the clearance between the upper and lower blades to a suitable value in response to the thickness of the material of the workpiece to be cut and an adjustment operation is performed when a lot of the material is to be cut through. In U.S. patent appln. Ser. No. 08/897,691, filed Jul. 21, 1997, the present applicant has proposed using an eccentric shaft on the pivoting support shaft, changing the position of the pivot center of the ram by adjusting the angle of pivot of the eccentric shaft and thus, adjusting the clearance as a means for adjustment of the clearance between the upper and lower blades. However, in the previously described apparatus, a minute amount of play is generated at the bearing, which is arranged between the pivoting support shaft (i.e., the eccentric shaft) and the ram, so that the bearing rigidity is insufficient and variation is generated in the clearance between the upper and lower blades. As the upper and lower blades on the right angle shear are relatively long, the slight amount of play and the lack of rigidity in the bearing leads to variation in the clearance. This variation can be reduced by applying pressure to the bearing, but resistance to the operations performed, when clearance adjustment is carried out due to rotation of the eccentric shaft, is generated, while the pressurized state, and thus, the adjustment operation is difficult to perform.

SUMMARY OF THE INVENTION

In order to solve these problems, it is an object of the present invention to provide a workpiece cutting device that is able to reduce the variation in the clearance between the upper and lower blades and for which the clearance adjustment operation is simple.

The workpiece cutting apparatus of the present invention cuts by a pair of upper and lower blades, has a freely pivotable ram on which the upper blade is mounted, and is arranged with an axial direction pressure application means, which can freely remove the pressure being applied, and which exerts pressure in the axial direction on the ram pivot.

Accordingly, as the ram pivot is pressurized in the axial direction by the axial direction pressure application means and the resulting play in the axial direction with respect to the pivotal movement of the ram is prevented, the variation in the clearance of the upper blade and the lower blade due to this play may be removed. When adjusting the clearance, the pressure application by the axial direction pressure application means is removed and the resulting operations, such as positional change of the pivot for clearance adjustment or the like, are not hindered by the applied pressure so that the clearance adjustment operations may be performed easily.

With the workpiece cutting apparatus, the pivot point of the ram includes a bearing having an inner wheel race mounted on the pivoting support shaft and the outer wheel race mounted on the ram. The axial direction pressure application means may exert pressure in the axial direction on the bearing. The bearing may support an axial directional force of a certain degree and a slide bearing, such as a spherical bearing or similar. With this arrangement, the pivotal movement of the ram is stable because of the high support rigidity of the bearing due to the pressurizing of the bearing and the variation in clearance between the upper and lower blades is reduced. Furthermore, by removing the pressurization of the bearing, there is no hindrance due to pressurization of the adjustment operations on the bearing for clearance adjustment and thus, the clearance adjustment operations may be performed easily.

Furthermore, with this arrangement, the pair of upper and lower blades are approximately L-shaped and the pivoting support shaft may be arranged at an angle within a horizontal plane with respect to each side of the pair of upper and lower blades. When the pivoting support shaft is angled in this way, the clearance adjustment of each side of the blades forming the L-shape may be performed simultaneously by applying pressure from the axial direction pressure application means.

Yet further, an eccentric system, that moves the rotation pivot of the ram forward and backwardly, is arranged and as the axial direction pressure application means supports the pivoting support shaft in a uniform position in the axial direction, a pressure is exerted on the pivoting support shaft. Moreover, as the pivot shaft is allowed to move forward and backwardly, the exerted force may be removed.

DETAILED DESCRIPTION OF THE PREFERRED EMBODIMENTS

Hereafter, a first embodiment of the present invention will be described using FIGS. 1 through 10.

Figure 5:
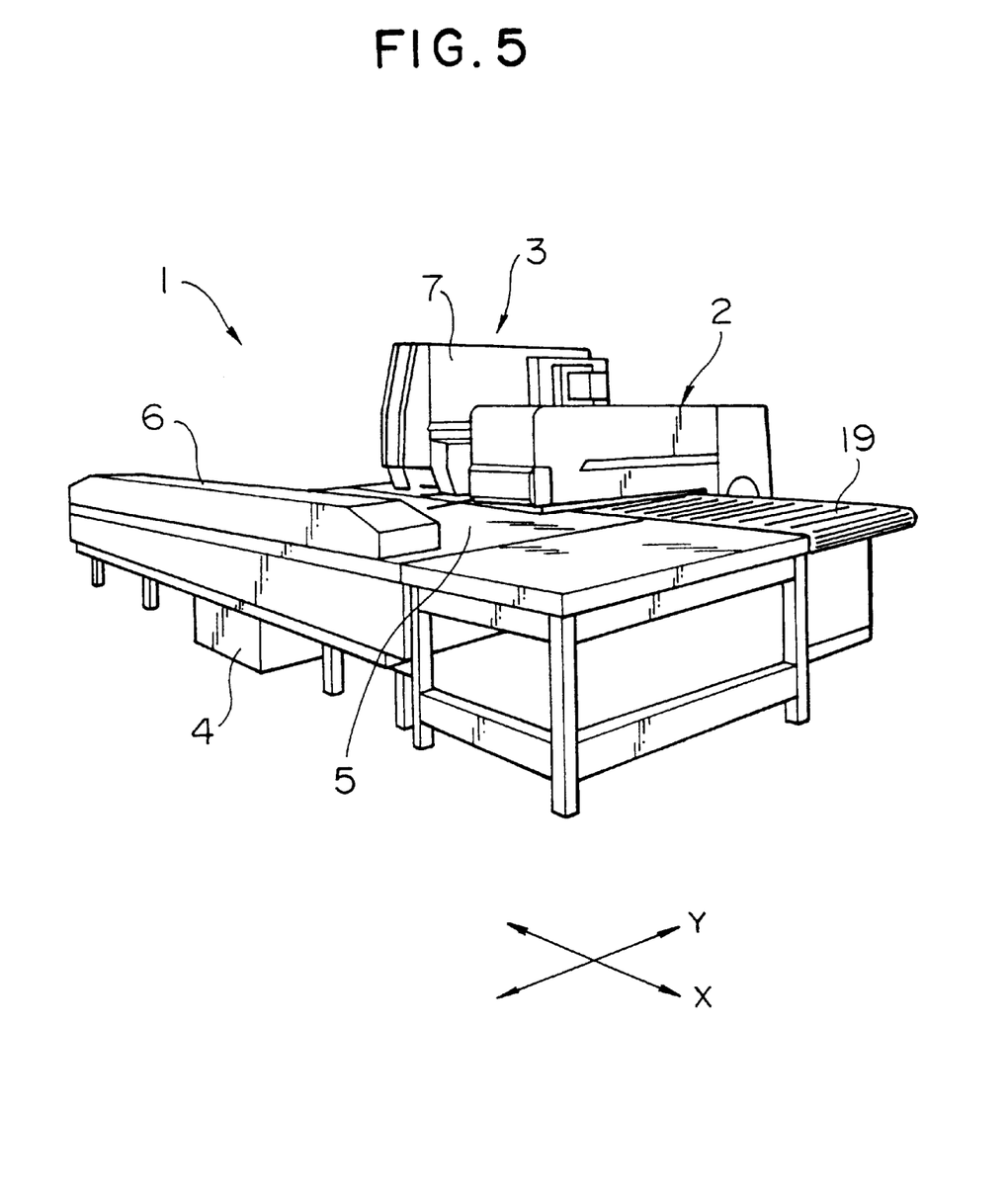
FIG. 5 is a perspective view of the outer appearance of a workpiece processing apparatus provided with the workpiece cutting apparatus of the first embodiment of the present invention.
Figure 6:
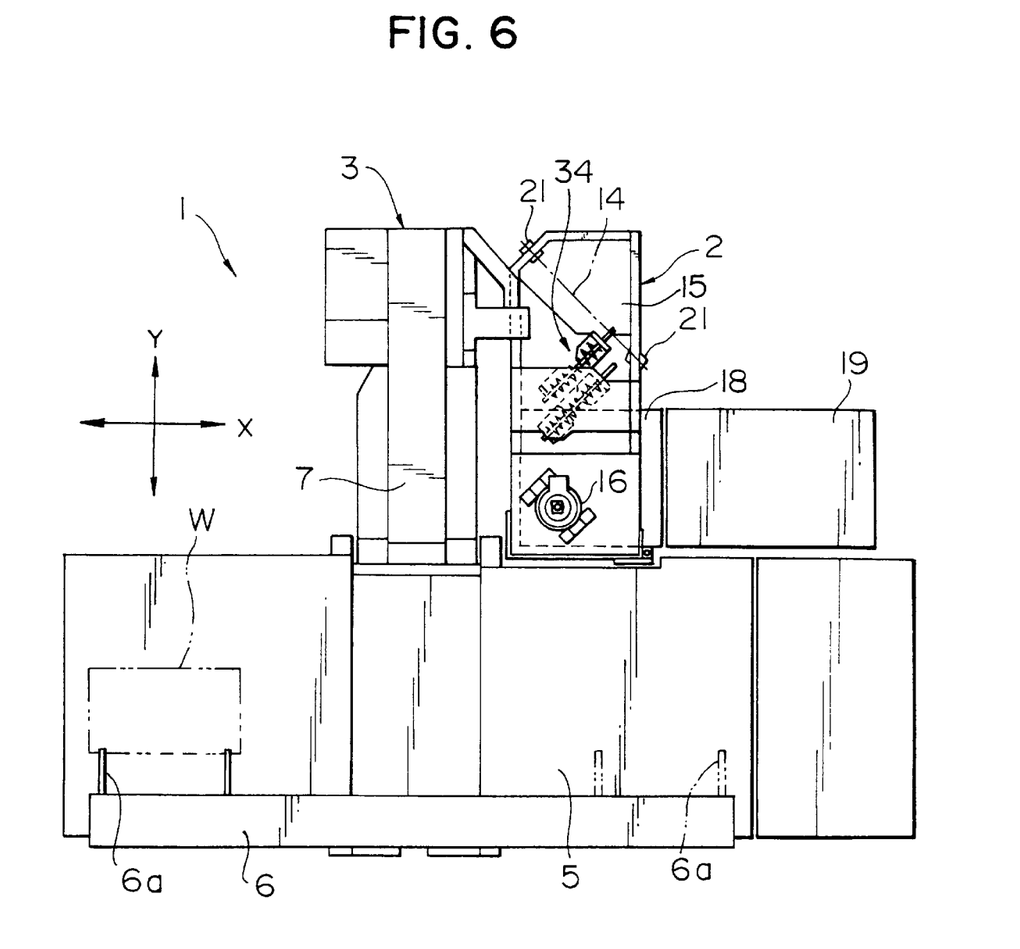
FIG. 6 is a plan view of a workpiece processing apparatus provided with the workpiece cutting apparatus of the first embodiment of the present invention.

FIGS. 5 and 6 show a perspective view and a plan view, respectively, of the workpiece processing apparatus provided with a workpiece cutting apparatus of the first embodiment of the present invention.

A workpiece processing apparatus 1 is arranged with a turret type punch press device 3 adjacent to a workpiece cutting apparatus 2 and comprises a compound device where both a workpiece table 5 and a workpiece delivery device 6 are common to both devices 2, 3. The workpiece delivery device 6 holds a workpiece W on the workpiece table 5 by a workpiece holder 6a, moves the workpiece W in the left and right direction (X-axis direction) and the front/back direction (Y-axis direction), spans both the cut processing part of the workpiece apparatus 2 and the punch press device 3, and has a delivery range enabling delivery of the workpiece W in a state of being held by the workpiece holder 6a.

A C-shaped punch frame 7 of the punch press 3 is arranged to the rear of a bed 4. An upper turret (not shown in the drawing figures) with a plurality of punch tools which are arranged in series, a lower turret (not shown in the drawing figures) with a plurality of dies corresponding to each of the aforementioned punch tools which are arranged in series, and a punch driving system (not shown in the drawing figures) that vertically drives the punch tool at a predetermined punch position, are also arranged to the rear of the bed 4.

The workpiece cutting apparatus 2 cuts the workpiece W which has had holes punched therein by the punch press device 3. the workpiece W is delivered by the workpiece delivery device 6. As shown in the plan view, front view, right side view, and left side view of FIGS. 1, 2, 3, and 4, respectively, the workpiece cutting apparatus 2 has a movable blade 12 and fixed blade 13 positioned vertically opposite each other on a frame 11, which is the main body of the workpiece cutting apparatus. The frame 11 has a vertical rectangular box shape with a cutaway open part 11a existing in the front surface and continuing to the middle of both sides. Thus, the side shape of the frame 11 forms a C-shape. The fixed blade 13, which is the lower blade, has a flat shape that curves in an L-shape from the left-right direction (X-axis direction) to the frontback direction (Y-axis direction) and is positioned along the inside lower edge of the cutaway open part 11a of the frame 11. The movable blade 12, which is the upper blade, has a flat L-shape following the inside of the fixed blade 13 and the blade tip is arranged with one type of slant (rake angle) from one end to the other end via the center curved part.

The movable blade 12 is mounted on the lower part of the tip of the ram 15 and is supported so as to be able to freely rotate vertically via the pivoting support shaft 14 on the rear part of the frame 11. A drive device 16 that vertically moves the ram 15 is arranged on the front upper surface of the frame 11. The ram drive device 16, the ram 15, the pivoting support shaft 14, and similar, form a movable blade drive system 17 that moves the movable blade 12 vertically. Due to the vertical movement of the driving system 17, the movable blade 12 engages with the fixed blade 13 and a cutting process is performed by the shearing of the workpiece W.

Furthermore, a conveyor 18 ejects the cut sample, which is cut from the workpiece W by the moveable blade 12 and the fixed blade 13 in the transport direction A parallel with the x-axis direction, and the conveyor 18 is arranged on the inside of the frame 11. A secondary conveyor 19 further moves the cut sample which have been transported by the conveyor 18. The secondary conveyor 19 is positioned on the next level of the conveyor 18.

Figure 1:
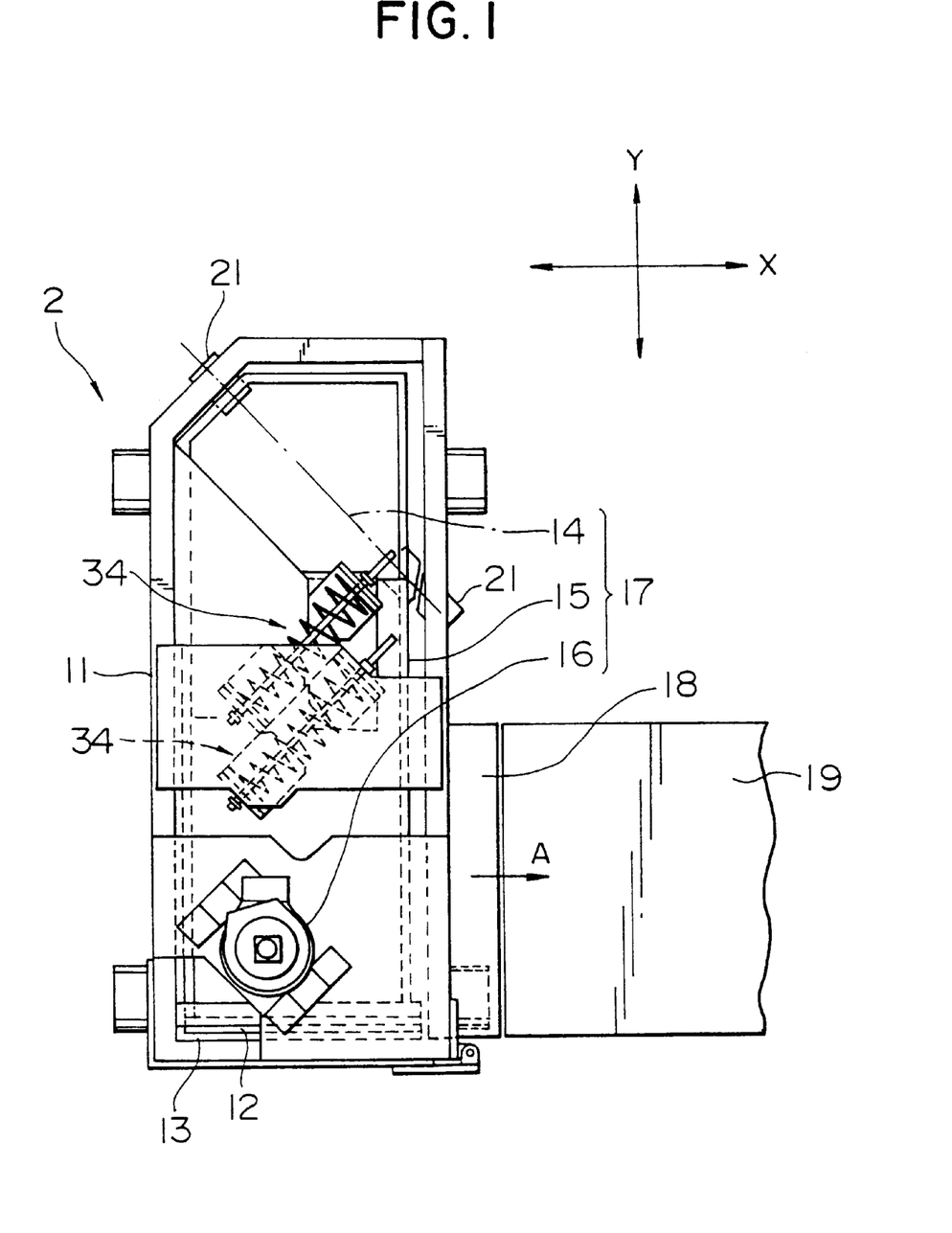
FIG. 1 is a partial plan view of a first embodiment of the workpiece cutting apparatus of the present invention.
Figure 2:
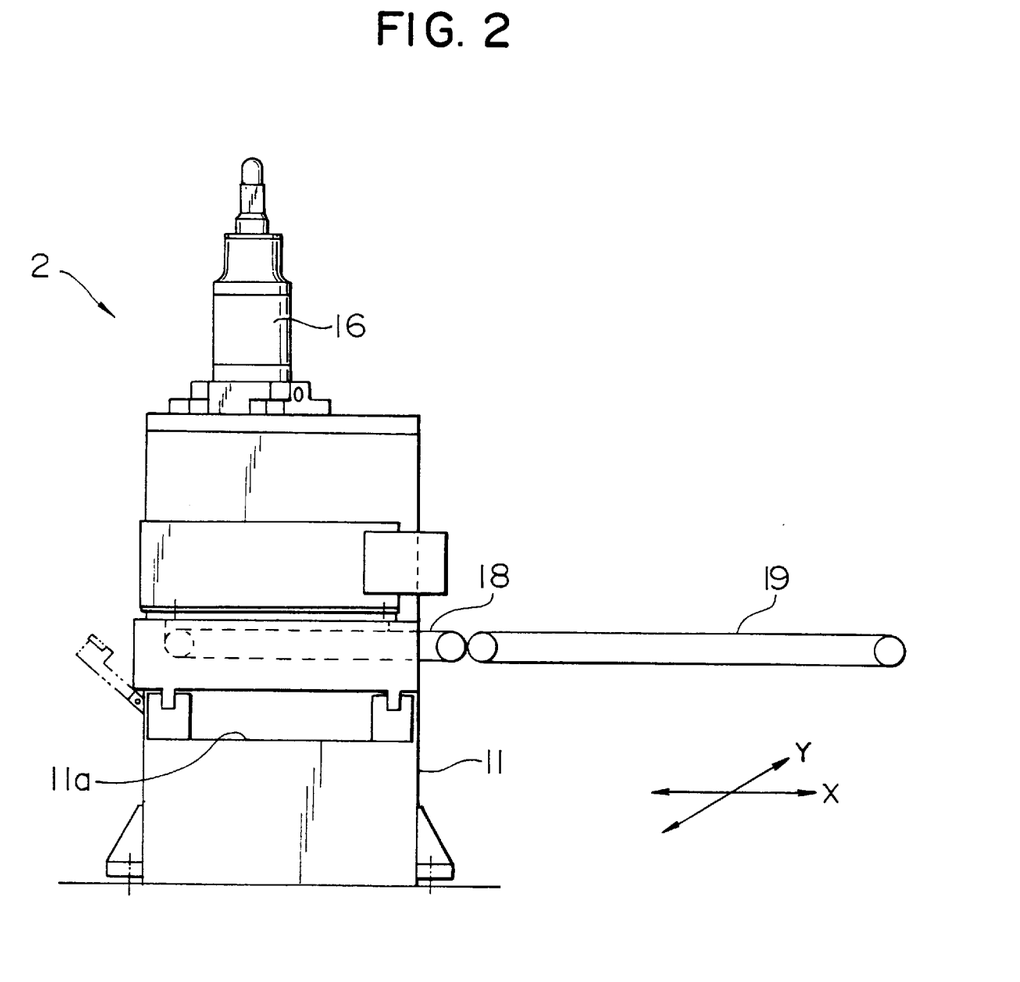
FIG. 2 is a front view of the workpiece cutting apparatus of the first embodiment of the present invention.
Figure 3:
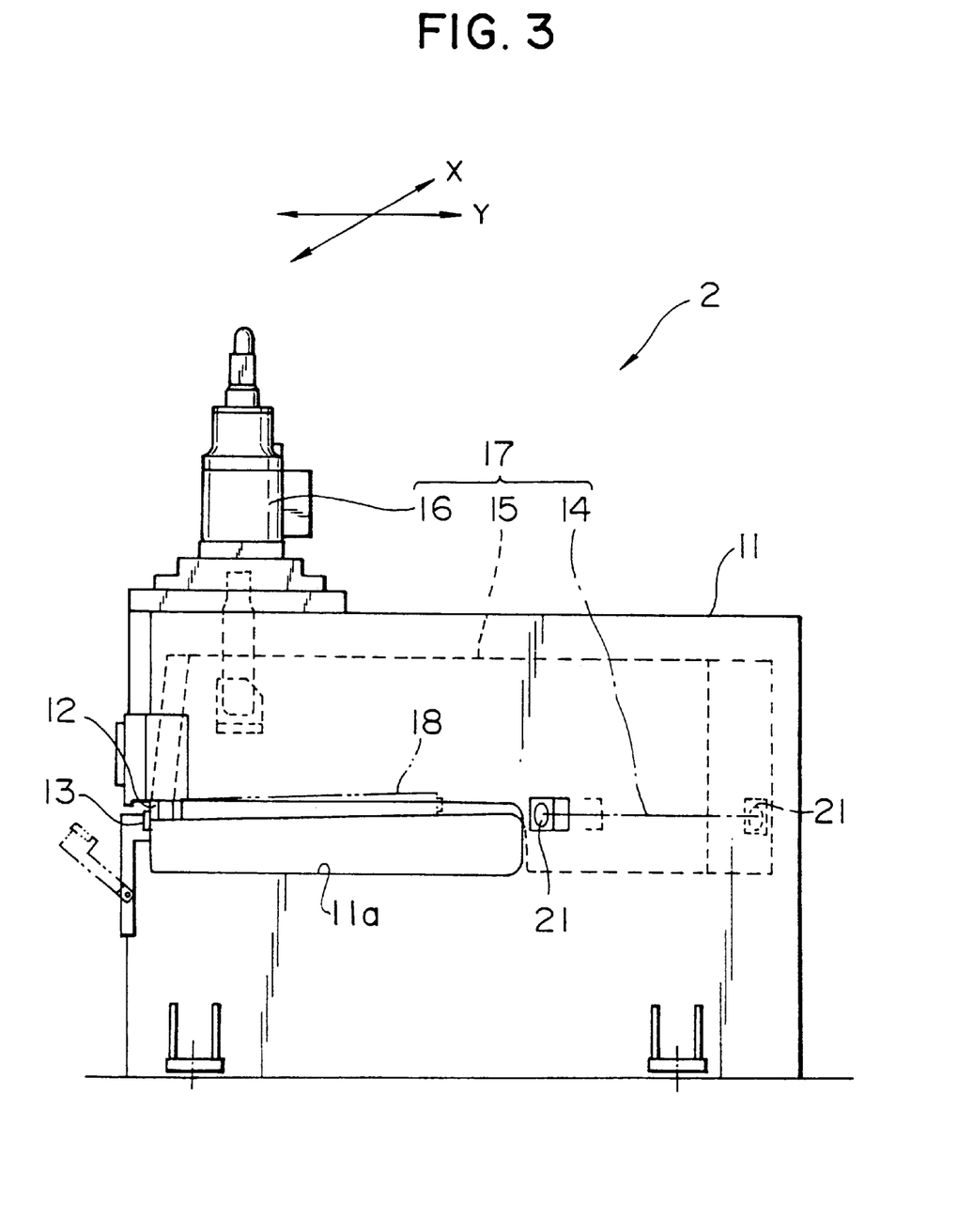
FIG. 3 is a right side view of the workpiece cutting apparatus of the first embodiment of the present invention.
Figure 4:
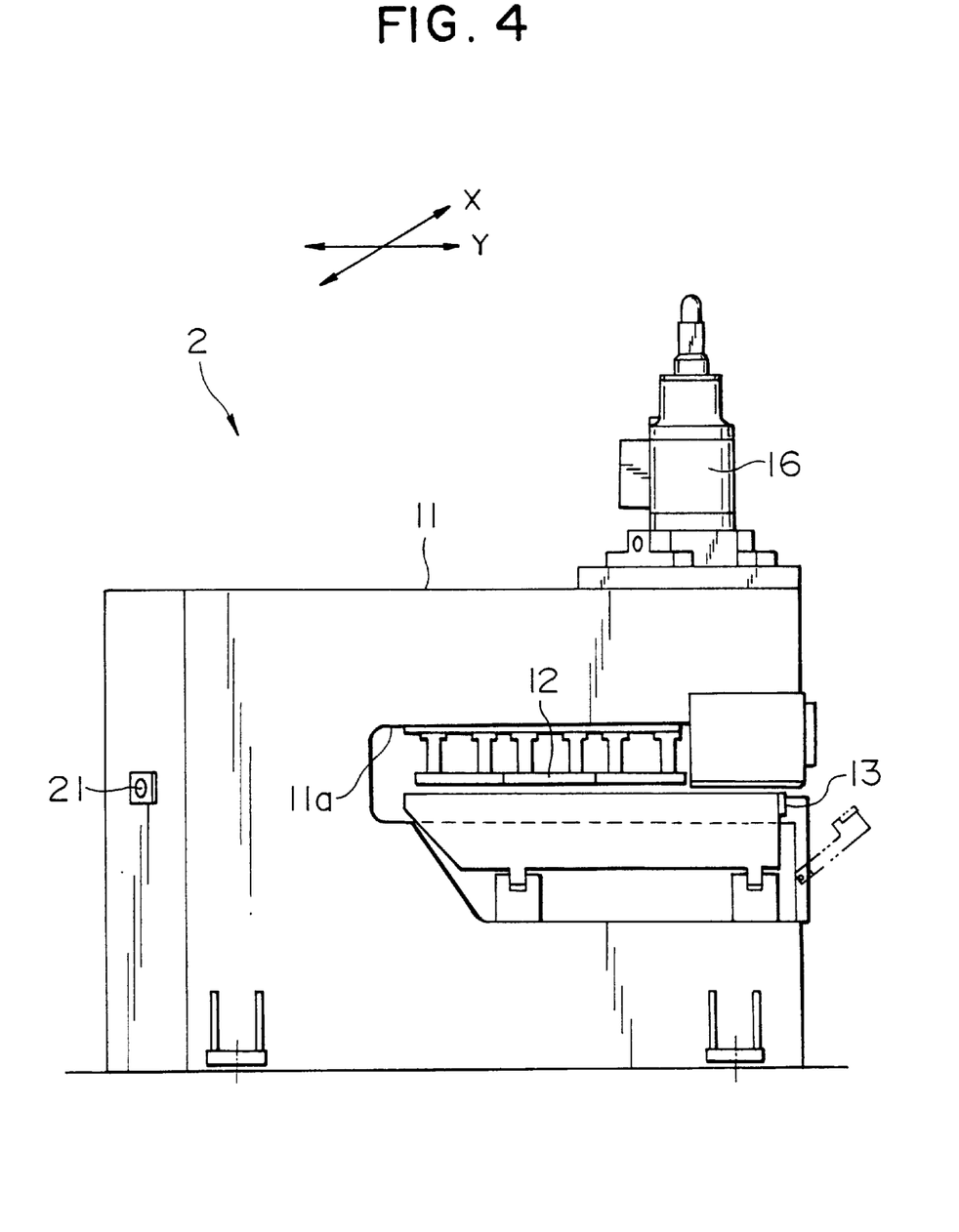
FIG. 4 is a left side view of the workpiece cutting apparatus of the first embodiment of the present invention.
Figure 7:
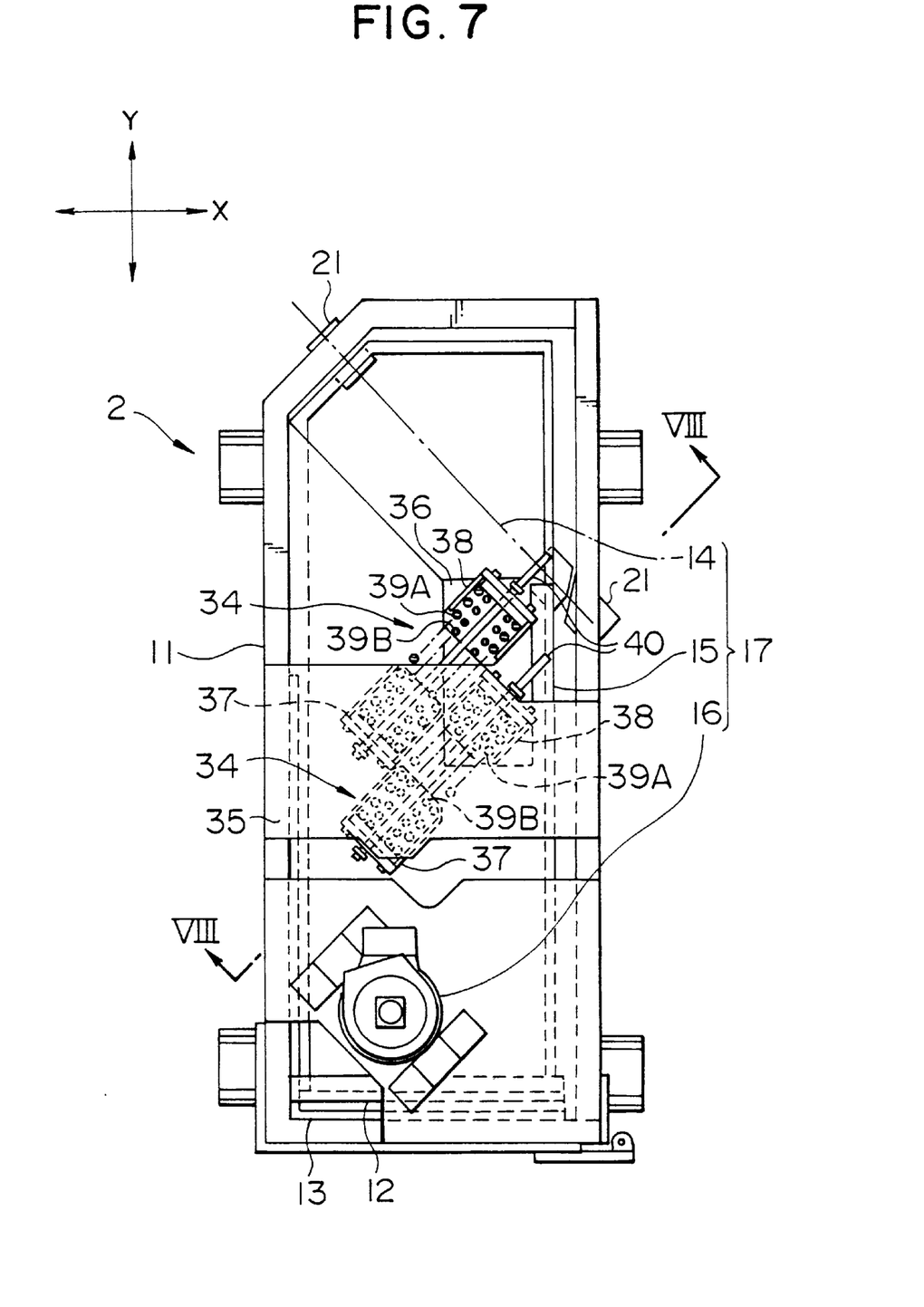
FIG. 7 is an enlarged plan view showing the main part of the workpiece cutting apparatus of the first embodiment of the present invention.
Figure 9A:
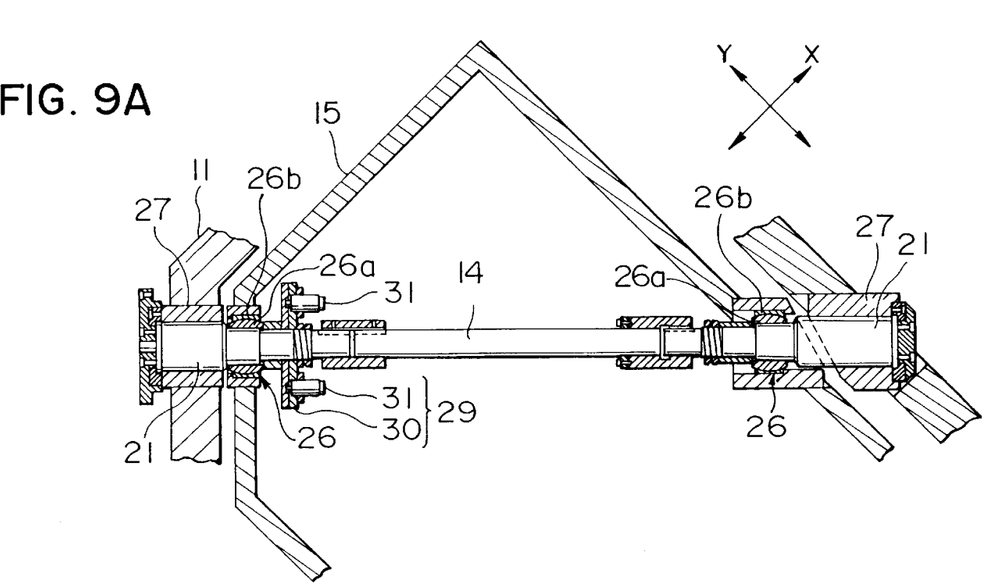
FIG. 9A is an enlarged horizontal cross-sectional view showing the attachment part of the pivoting support shaft on the workpiece cutting apparatus of the first embodiment of the present invention.

As shown in the plan views of FIG. 1, FIG. 7, and FIG. 9, the pivoting support shaft 14 is set so that the axial direction is angled with respect to both sides of the L-shaped fixed blade 13, such as, for example, in a direction angled 45° with respect to both the X-axis and Y-axis. The ram 15 is supported with respect to the pivoting support shaft 14 so as to be able to freely rotate via bearings 26 at both sides. The bearings 26 mount the pivoting support shaft 14 of the ram 15. A spherical bearing, having an inner wheel race 26a mounted on the pivoting support shaft 14 and the outer wheel race 26b mounted on the ram 15, is used as the bearings 26.

Figure 10A:
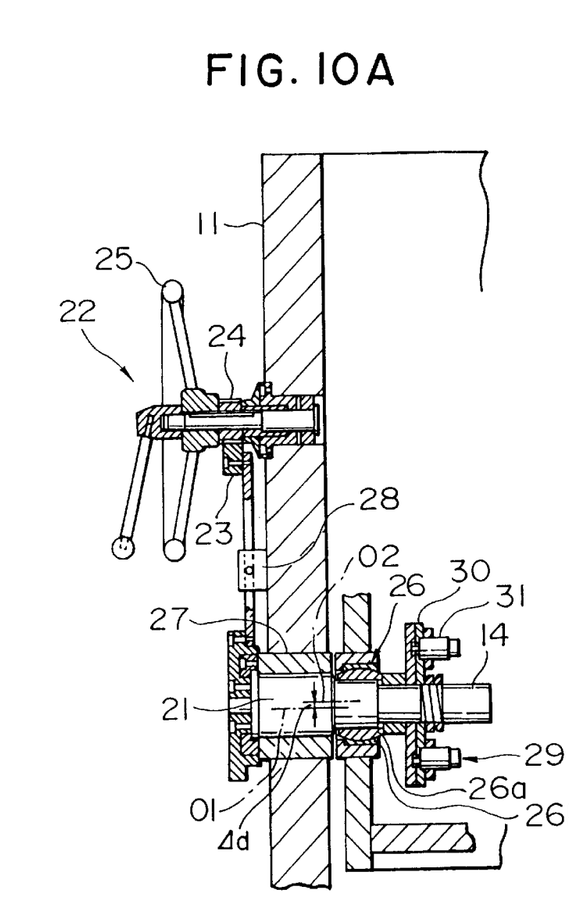
FIG. 10a is a vertical cross-sectional view showing the movable blade adjustment means on the workpiece cutting apparatus of the first embodiment of the present invention.

Furthermore, as shown in the vertical cross-sectional view of FIG. 10A, the pivoting support shaft 14 is arranged off center. The pivoting support shaft 14 is also arranged integrally with the rotation shaft 21 which is supported via a seat 27 on the frame 11. Specifically, when the rotation shaft 21 is in the standard rotating position, the shaft center 02 of the pivoting support shaft 14 is slightly upwardly off-center by the amount Δd with respect to the shaft center 01 of the rotation shaft 21. Furthermore, when the rotation shaft 21 is in the standard pivoting position, the clearance of the horizontal direction of the movable blade 12, with respect to the fixed blade 13, is set to be the optimum for cutting the workpiece W of a predetermined thickness.

Figure 10B:
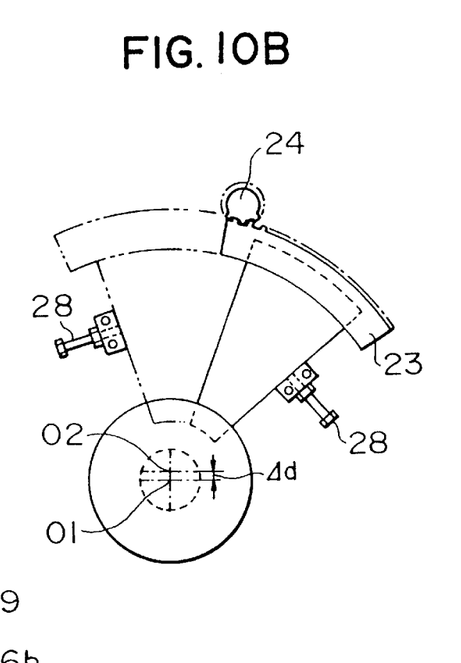
FIG. 10B is a side view showing the main part of the movable blade adjustment means on the workpiece cutting apparatus of the first embodiment of the present invention.

A manual type movable blade adjustment means 22 is linked to the rotation shaft 21. The movable blade adjustment means 22 is a means for adjusting the horizontal position of the movable blade 12 with respect to the fixed blade 13 by minute changes to the front and rear of the shaft center of the pivoting support shaft 14 due to the rotating of the rotation shaft 21. The movable blade adjustment means 22 comprises a sector gear 23, fixed to the end of the rotation shaft 21, and an adjustment handle 25, having a pinion 24 on the shaft part that engages with the sector gear 23. The adjustment handle 25 is mounted on the frame 11 so as to be freely rotatable.

When the adjustment handle 25 is rotated, the rotation shaft 21 rotates in a direction opposite of the adjustment handle 25 by a distance equivalent to the distance that the adjustment handle 25 was rotated. The position of the pivoting support shaft 14 is adjusted to the front and rear. Due to this, the clearance of the movable blade 12, with respect to the fixed blade 13, is adjusted corresponding to the thickness of the workpiece W to be cut.

As the pivoting support shaft 14 is positioned at an angle of 45° with respect to both sides of the fixed blade 13, adjustment for both the side following the X-axis direction of the movable blade 12 and that following the Y-axis direction may be simultaneously performed by the aforementioned single adjustment.

Furthermore, there is no need to arrange the movable blade adjustment means 22 for each side (i.e., one is sufficient and has a simple arrangement).

It should be noted that the adjustment amount by the movable blade adjustment means 22 is limited by a pair of stoppers 28 which contact the sector gear 23 arranged on the frame 11.

Furthermore, the movable blade adjustment means 22 is a manual type, as shown in the drawing figures, but may be a driven type that changes the rotation angle of the rotation shaft 21 with a servomotor or similar as a drive source.

Figure 10C:
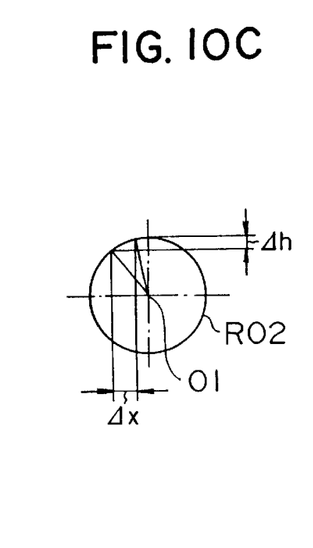
FIG. 10C is an explanation of the adjustment actions.

FIG. 10C shows the rotation path R02 of the shaft center 02 of the pivoting support shaft 14 with respect to the shaft center 01 of the rotation shaft 21 in association with the movable blade adjustment. As clearly shown in the drawing figures, the position of the pivoting support shaft 14 changes, not only towards the front and rear, but also vertically. However, as previously described, by the movable blade adjustment means, when the rotation shaft 21 is in the standard rotating position, the shaft center 02 of the pivoting support shaft 14 is upwardly eccentric from the shaft center 01 of the rotation shaft 21. Therefore, the vertical positional change amount Δh is extremely small, as compared to the positional change Δx to the front and rear of the pivoting support shaft 14 by the adjustment. Considering the size of the ram 15, the vertical positional change may be ignored. Furthermore, the larger the distance between the pivoting support shaft 14 and movable blade 12, the more insignificant this vertical positional change.

Figure 9B:
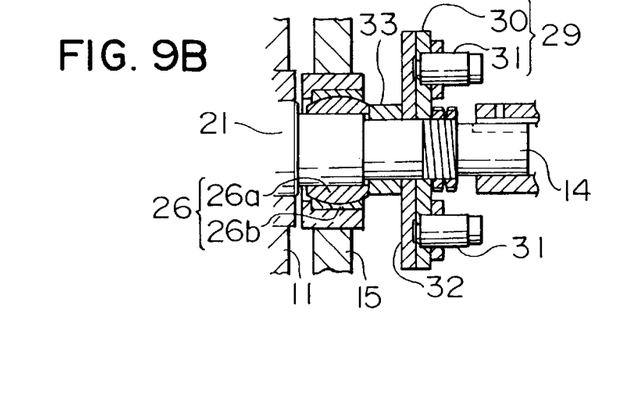
FIG. 9B is an enlarged horizontal cross-sectional view showing the axial direction pressure application means on the workpiece cutting apparatus of the first embodiment of the present invention.
Figure 9C:
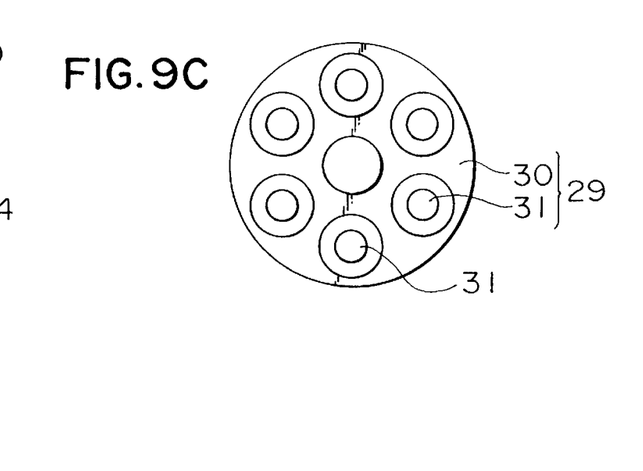
FIG. 9C is an enlarged side view of the axial direction pressure application means of the workpiece cutting apparatus of the present invention.

Furthermore, an axial direction pressure application means 29 that prevents play in the axial direction of the ram 15 with respect to the pivoting support shaft 14 is arranged on the pivoting support shaft 14. The axial direction pressure application means 29 comprises: a plurality of hydraulic cylinders 31 mounted on a support plate 30 fixed to the pivoting support shaft 14; a pressure plate 32 linked to a piston rod 31a of each cylinder 31 and clearance fitted to the pivoting support shaft 14; and a spacer 33 intervening between the pressure plate 32 and the inner wheel race 26a of the bearing 26. the plurality of cylinders 31 are very distributed around the periphery of the pivoting support shaft 14.

When the pressure plate 32 applies pressure to the side of the bearing 26 by the extension of the cylinder 31, the applied pressure is exerted on the inner wheel race 26a of the bearing via the spacer 33. Due to this, as the pivoting support shaft 14 is pushed in a direction opposite to that on which the pressure is applied, play in the axial direction of the ram 15, with respect to the pivoting support shaft 14, is removed and the bearing 26 enters a pressurized state. As a result, the variation in clearance, between the movable blade 12 and fixed blade 13, arising from play of the ram 15 and inadequate support rigidity of the bearing 26, is prevented.

In particular, in the present embodiment, as the pivoting support shaft 14 is set in a direction at an angle with respect to all the sides of the movable blade 12 and fixed blade 13, the variation in the clearance between both sides of the movable blade 12 and fixed blade 13 may be prevented by the actions of the axial direction pressure application means 29.

It should be noted that, when the movable blade 12 is to be adjusted as described previously, it is possible to remove the pressure on the inner wheel race 26a of the bearing 26 by removing the extension of the cylinder 31 and rotating the pivoting support shaft 14 with respect to the bearing 26 with no resistance.

As shown in the plan view and vertical cross-sectional view of FIGS. 7 and 8, respectively, two exertion means 34 that push the ram 15 in the upwardly pivoting direction, are arranged between the upper part of the frame 11 and the upper part of the ram 15.

The two exertion means 34 comprise: a spring receptor member 37 fixed to the upper support plate 35 of the frame 11; a spring receptor member 38 fixed to the upper support plate 36 of the ram 15; a plurality of compressed coil springs 39A, 39B that fit on both of the spring receptor members 37, 38; and a center rod 40 inserted loosely into both spring receptor members 37, 38 such that the center rod 40 cannot be removed. A uniform rigidity is applied to the two exertion means 34 by the center rod 40. The two exertion means 34 are set horizontally, such that the axial direction (in short, the direction of the center rod 40) is at right angles to the pivoting support shaft 14. Due to this, the horizontal component of the exerted force of the two exertion means 34 is at right angles to the pivoting support shaft 14 of the ram 15.

It should be noted that in the present embodiment, in order for enough exerted force of the two exertion means 34 to be generated, the two exertion means 34 are positioned parallel to each other in the same direction (in short, the ends of the compressed coil springs 39A, 39B of each of the two exertion means 34 are each aligned along the vertical side of the upper and lower blades 12, 13). In this way, each of the two exertion means 34 comprises: a plurality of compressed coil springs 39a, 39B and due to the arrangement of the two exertion means 34, the two exertion means 34, having sufficient exertion force, may be compactly positioned in the restricted space between the upper part of the frame 11 and the upper part of the ram 15.

Figure 8A:
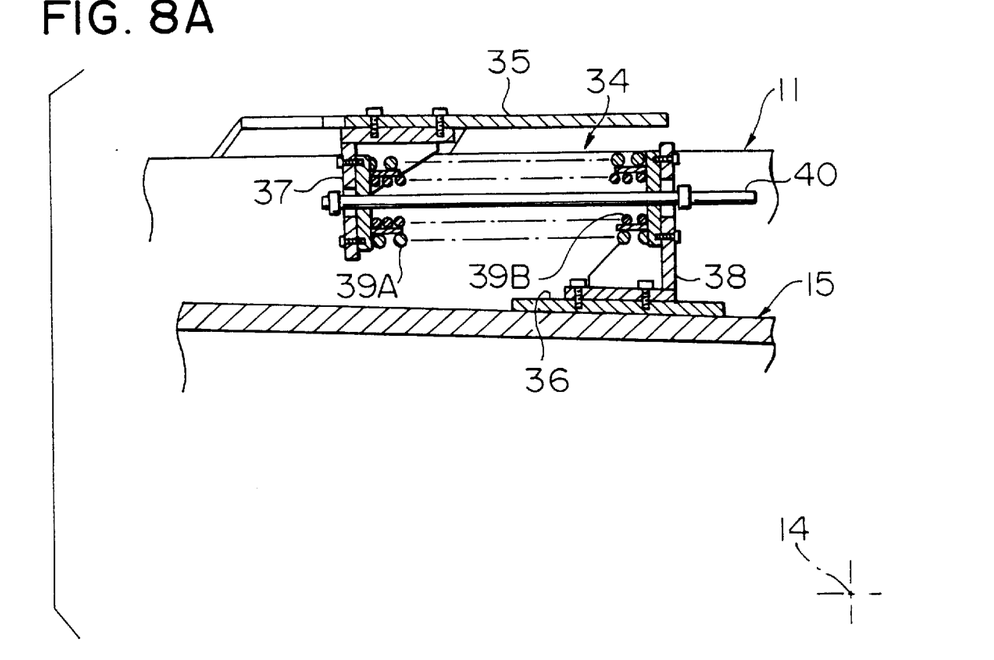
FIG. 8 is an explanatory diagram of the actions of the two exertion means on the workpiece cutting apparatus of the first embodiment of the present invention.

The two exertion means 34 exert a force on the ram 15 in the upwardly pivoting direction as shown in FIG. 8A. The horizontal component of the exerted force of the compressed coil springs 39A, 39B is at right angles with respect to the pivoting support shaft 14 above the pivoting support shaft 14. Due to this, the ram 15 always forcibly returns to the home position, when in the raised position, due to the two exertion means 34. This promotes safety and enables simple maintenance inspection and repair operations even when there are problems such as the stoppage of the drive device 16 due to a power failure.

Furthermore, the two exertion means 34 are positioned at right angles with respect to the pivoting support shaft 14 and as the two exertion means 34 pivot in the same direction as the pivotal movement of the ram 15, the clearance, between the upper and lower movable blades 12 and fixed blade 13 due to the existence of the exertion means 34, changes. Thus, the ram 15 can be prevented from being slack.

Figure 8B:
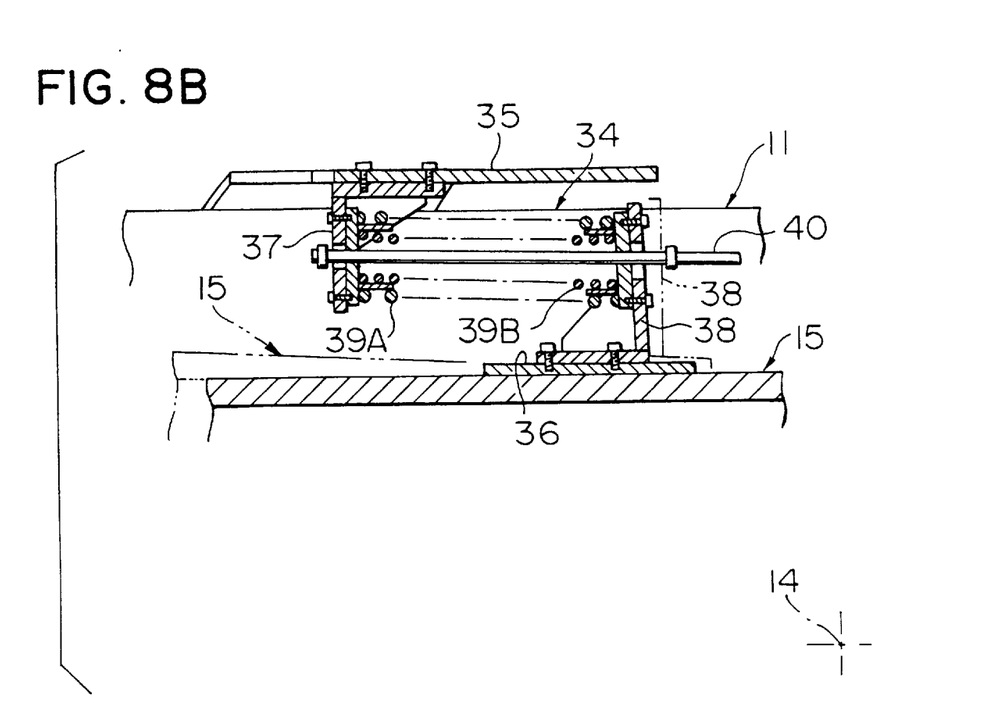

It should be noted that when the ram 15 is pivoted downwardly by the ram drive device 16, the ram drive device 16 works against the exerted force of the two exertion means 34 as shown in FIG. 8B.

The workpiece cutting apparatus of the present invention cuts by a pair of upper and lower blades, has a freely pivoting ram with an upper blade mounted thereon, and is arranged with axial direction pressure application means which can freely remove the pressure being applied and which exerts pressure in the axial direction on the rotation pivot of the ram. Thus, the variation in the clearance between the upper and lower blades may be reduced by applying a pressure in the axial direction to the rotation pivot, hindrance to the clearance adjustment by the applied pressure is prevented by removal of the pressure, and the clearance adjustment may be easily performed.

In this arrangement, the point of rotation includes a bearing 26 having an inner wheel race 26a mounted on the pivoting support shaft 14 and an outer wheel race 26b mounted on the ram 15. When the axial direction pressure application means 29 exerts a pressure in the axial direction on the bearing 26, the rotation of the ram is stable due to the increased support rigidity by the pressurization of the bearing, and the variation in the clearance between the upper and lower blades is reduced. Furthermore, hindrance, due to pressurization to the adjustment operation of the bearing in order to adjust the clearance, is reduced and the clearance adjustment operation may be performed simply.

Furthermore, in this arrangement, when the pair of upper and lower blades are approximately L-shaped and the pivoting support shaft is positioned at an angle within a horizontal plane with respect to each side of the pair of upper and lower blades, the clearance adjustment of each of the blade forming the L-shape may be performed simultaneously and the variation in the clearance of each side may also be removed simultaneously be pressurizing with the axial direction pressure application means. Accordingly, the variation in clearance on both sides may be removed by a simple arrangement.

I claim:

1. A workpiece cutting apparatus, comprising:
    a frame;
    a ram having one end connected to said frame by a pivot shaft to enable free pivotal movement of said ram about said pivot shaft;
    a fixed blade attached to said frame;
    a movable blade attached to said ram at an end opposite said one end and cooperable with said fixed blade for cutting said workpiece;
    drive means connected to said ram for imparting pivotable movement thereto; and
    axial direction pressure application means for removing play between said ram and said pivot shaft, including:
        a bearing mounting said ram to said pivot shaft, said bearing including an inner wheel race concentrically mounted on said pivot shaft, and an outer wheel race concentrically mounted on said ram and surrounding said inner race, said inner and outer races having cooperating arcuate surfaces circumferentially slidable with respect to each other,
        a support plate fixed to said pivot shaft,
        a pressure plate loosely supported on said pivoting support shaft adjacent said support plate,
        cylinder means attached to said support plate and having extendable piston rod means connecting said pressure plate,
        means for engaging said pressure plate to one of said inner wheel race and said outer wheel race, and
        means for releasably actuating said cylinder means for moving said pressure plate and, hence, said one wheel race with respect to the other wheel race for removing play between said ram and said pivot shaft.

2. The workpiece cutting apparatus as in claim 1, wherein said movable and fixed blades have an L-shape, and said pivoting support shaft is angled within a horizontal plane with respect to each side of said blades.

3. The workpiece cutting apparatus as claimed in claim 1, wherein when said rotation shaft is in a standard rotating position, a shaft center of said pivoting support shaft is slightly upwardly off-center by a first predetermined amount with respect to a shaft center of the rotation shaft.

4. The workpiece cutting apparatus as claimed in claim 3, wherein when said rotation shaft is in said standard rotating position, a clearance in a horizontal direction between said pair of upper and lower blades is set to be an optimum for cutting said workpiece having a predetermined thickness.

5. A workpiece cutting apparatus according to claim 1 including a rotation shaft eccentrically disposed with respect to said pivoting support shaft, said rotation shaft being axially integrally formed on said pivoting support shaft and being rotatably mounted in said frame.

* * * * *